United States Patent
Bensing et al.

(10) Patent No.: US 6,474,272 B2
(45) Date of Patent: Nov. 5, 2002

(54) APPARATUS FOR CONDENSATION OF STEAM

(75) Inventors: Heinz-Dieter Bensing, Herne; Benedict Korischem, Düsseldorf, both of (DE)

(73) Assignee: GEA Energietechnik GmbH, Bochum (DE)

( * ) Notice: Subject to any disclaimer, the term of this patent is extended or adjusted under 35 U.S.C. 154(b) by 0 days.

(21) Appl. No.: 09/832,184

(22) Filed: Apr. 10, 2001

(65) Prior Publication Data

US 2002/0005176 A1 Jan. 17, 2002

Related U.S. Application Data

(63) Continuation of application No. PCT/DE00/02714, filed on Aug. 9, 2000.

(30) Foreign Application Priority Data

Aug. 10, 1999 (DE) .......................................... 199 37 800

(51) Int. Cl.[7] .................................................. F22B 9/06
(52) U.S. Cl. ........................ 122/459; 165/110; 165/126
(58) Field of Search .......................... 122/459; 165/110, 165/111, 67, 124, 126

(56) References Cited

U.S. PATENT DOCUMENTS

| | | | | |
|---|---|---|---|---|
| 3,612,172 A | * | 10/1971 | Dohnt .......................... | 165/111 |
| 3,716,097 A | * | 2/1973 | Kelp et al. .................... | 165/101 |
| 3,939,906 A | * | 2/1976 | Rothenbucher ............... | 165/124 |
| 4,000,779 A | * | 1/1977 | Irwin ........................... | 165/111 |
| 4,129,180 A | * | 12/1978 | Larinoff ....................... | 165/111 |
| 4,177,859 A | * | 12/1979 | Gatti et al. ................... | 165/113 |
| 4,513,813 A | * | 4/1985 | Zanobini ...................... | 165/110 |
| 4,657,070 A | * | 4/1987 | Kluppel ....................... | 165/110 |
| 4,903,491 A | * | 2/1990 | Larinoff ....................... | 165/111 |
| 4,905,474 A | * | 3/1990 | Larinoff ....................... | 165/111 |
| 5,448,830 A | | 9/1995 | Borchert et al. | |
| 5,653,281 A | * | 8/1997 | Berg et al. ................... | 165/111 |
| 5,896,918 A | * | 4/1999 | Witte .......................... | 165/111 |
| 5,950,717 A | * | 9/1999 | Fay ............................. | 165/111 |

FOREIGN PATENT DOCUMENTS

| | | |
|---|---|---|
| DE | 12 28 640 B | 11/1966 |
| DE | 34 14 589 A | 12/1984 |
| EP | 0 170 753 A | 2/1986 |

* cited by examiner

*Primary Examiner*—Jiping Lu
(74) *Attorney, Agent, or Firm*—Henry M. Feiereisen

(57) ABSTRACT

Apparatus for the condensation of steam, includes a substructure, a fan supported by the substructure and a plurality of self-supported tube bundles which are arranged in a roof-shaped manner in opposing relationship with respect to a vertical center longitudinal plane and mounted to the substructure above the fan, with each of the tube bundles having an upper tube plate and a lower tube plate. A steam distribution duct is fluidly connected to the upper ends of the tube bundles, whereas condensate collection pipes are fluidly connected to the lower ends of the tube bundles. The upper tube plates of opposite tube bundles so mutually support one another as to allow a limited pivotal movement of the tube bundles, and the condensate collection pipes are so positioned on the substructure as to be shiftable relative to the substructure in parallel relationship to the center longitudinal axis.

18 Claims, 7 Drawing Sheets

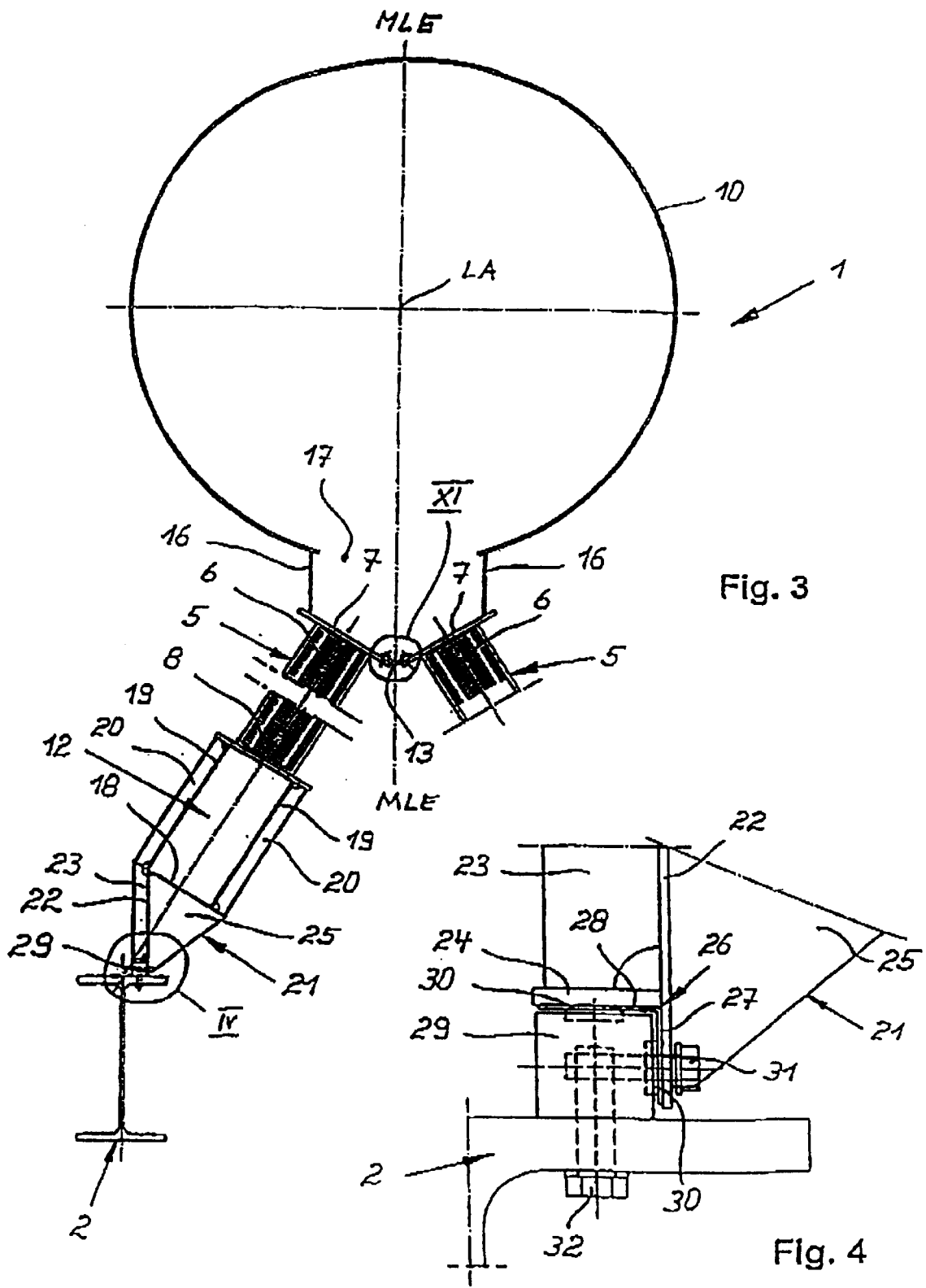

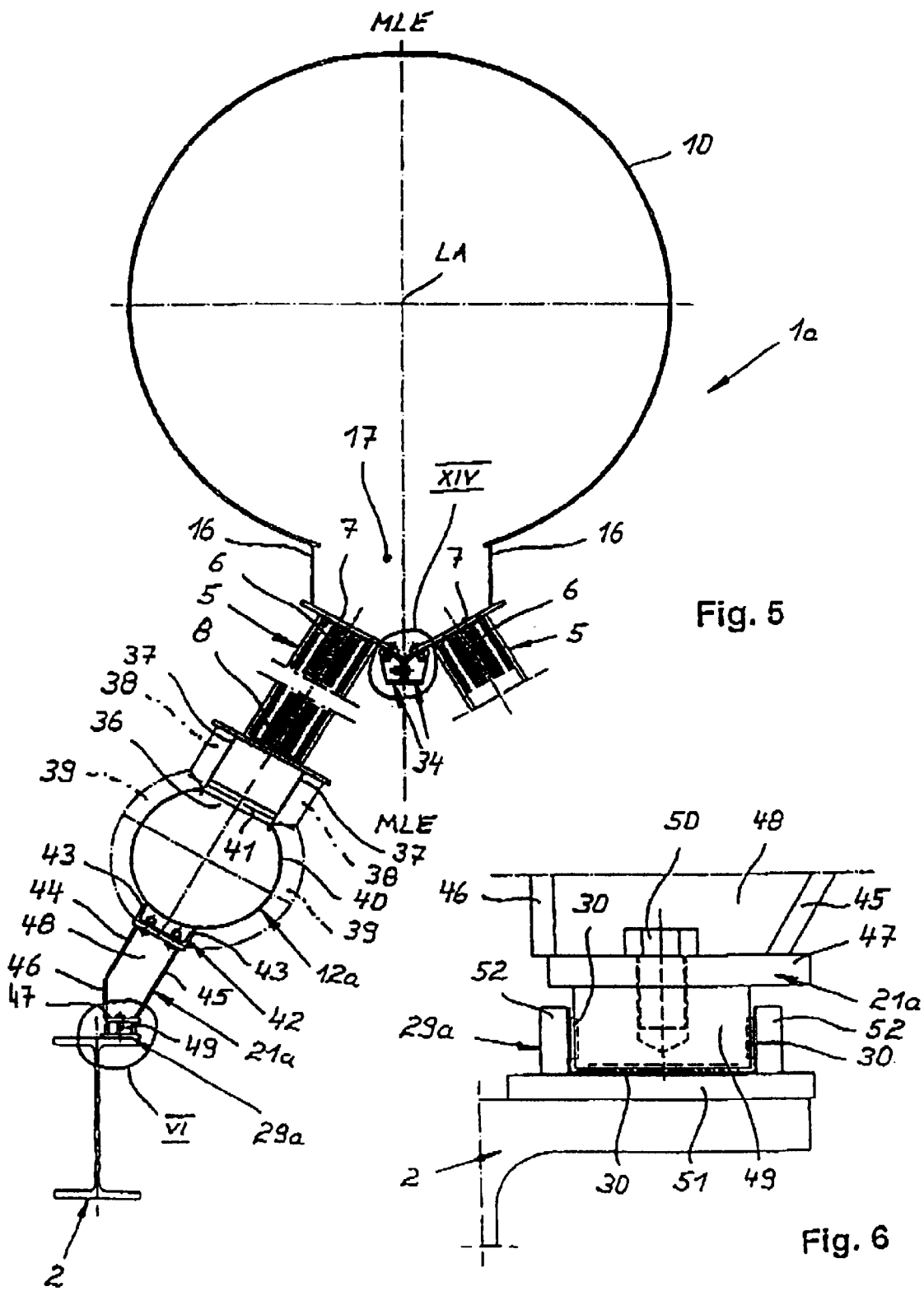

APPARATUS FOR CONDENSATION OF STEAM

CROSS-REFERENCES TO RELATED APPLICATIONS

This application is a continuation of prior filed copending PCT International application no. PCT/DE00/02714, filed Aug. 9, 2000.

This application claims the priority of German Patent Application Serial No. 199 37 800.2, filed Aug. 10, 1999, the subject matter of which is incorporated herein by reference.

BACKGROUND OF THE INVENTION

The present invention relates to an apparatus for condensation of steam.

It is known to provide air-cooled condensation plants with tube bundles of A-shaped or pitched-roof configuration which have proven to be cost-effective. The tube bundles are normally mounted in the form of a steel structure at an angle of 60° to the upper platform of a substructure. The distance of the platform from the ground is dependent from the intake of respectively necessary amounts of cooling air. The upper ends of the tube bundles are fluidly connected to a common steam distribution duct. The steam to be condensed is conducted into the tube bundles via the steam distribution duct and condensed in the mainly externally ribbed tubes of the tube bundles, whereby the air intake is intensified by installing a ventilating fan below a certain number of tube bundles approximately in the plane of the platform. Depending on the type of admission, the lower ends of the tube bundles are connected to condensate collection pipes or dephlegmator pipes. The surrounding zone in the area of a ventilating fan is also called ventilating field.

The tube bundles, which oftentimes have a width of approximately 2.5 meters and a length of inclination of several meters, are generally not designed in a self-supported manner. Therefore, it is necessary to provide each tube bundle with a support frame which normally includes two slanted posts interconnected to one another and braced with the opposing support frame by crossbars. The support frames must be designed sufficiently stable to absorb in addition to the weight of the tube bundles also the weights, at least proportionately, of the steam distribution ducts and the condensate collection pipes as well as withstand forces from wind, snow and earthquakes. In addition, there are the forces of crane tracks located below the steam distribution duct and provided for the assembly and disassembly of the ventilating fans (motor, transmission).

Since the tube bundles are exposed to varying thermal stress, the greatest static load resulting from the own bundle weight has to be introduced via additional carriers at a statically inopportune location, i.e., in the area of the ridge and approximately in the lower third of the support frame in order to ensure a free thermal expansion of the tube bundles in longitudinal direction as well as in transverse direction.

As a consequence of the afore-mentioned factors, the conventional steam condensation apparatus has to be designed at comparably great size and correspondingly great weight.

It would therefore be desirable and advantageous to provide an improved apparatus for steam condensation which obviates prior art shortcomings and is light in weight and easy to assemble.

SUMMARY OF THE INVENTION

According to one aspect of the present invention, an apparatus for the condensation of steam includes a substructure; a fan supported by the substructure; a plurality of self-supported tube bundles arranged in a roof-shaped manner in opposing relationship with respect to a vertical center longitudinal plane and mounted to the substructure above the fan, with each of the tube bundles having an upper tube plate and a lower tube plate; a steam distribution ducts fluidly connected to upper ends of the tube bundles, condensate collection pipes fluidly connected to the tube bundles and mounted to an underside of the lower tube plates; wherein the upper tube plates of opposite tube bundles so support one another as to allow a limited pivotal movement of the tube bundles; and wherein the condensate collection pipes are so disposed on the substructure as to be shiftable relative to the substructure in parallel relationship to the center longitudinal axis.

An essential feature of the present invention is the self-supporting characteristics of the tube bundles. Thus, in their pure form, the tube bundles can be used as heat exchanger and, at the same time, for the reduction of static loads. The self-supporting function of the tube bundles is such that they do not only support themselves but are also able to receive the weight of the steam distribution duct as well as the condensate collection pipes (dephlegmator pipes) and also withstand forces from wind, snow and earthquakes and, if necessary, crane path loads.

Another essential feature of the present invention is the interconnection of opposite tube bundles to allow limited pivoting movement, and the attachment of the condensate collection pipes to the underside of the lower tube plates while allowing a displacement of the condensate collection pipes on the substructure parallel to the longitudinal center plane of the apparatus.

As a consequence of the self-supported design of the tube bundles, the need for expensive support frames for the tube bundles can thus be completely eliminated. The process requires only the provision of comparably light partition walls at the end face of a ventilation field. Internal calculations have determined that the total weight per ventilation field to be supported by the substructure can be reduced by approximately 65%.

As the condensate collection pipes are located directly underneath the tube bundles, the dimension of the apparatus can be decreased while a same output can be maintained, so that size and weight of the substructure can be reduced.

The particular disposition of the condensate collection pipes upon the tube bundles enables also a significant reduction in height of the steam distribution duct and thus of the entire apparatus, thereby greatly increasing the field of application, when taking into account that oftentimes customers have only limited heights available for placement of such apparatuses. Because of the reduced installation height as well as the reduced width of the apparatus, a wind screen to surround the steam condensation apparatus can also be kept lower and the length of the steam distribution duct can be shortened on the ridge-side longitudinal area. As a result, the weight of these components and the trapezoidal sheet plane for a wind screen lining can be reduced. The reduced construction height in view of smaller component size and reduced structural steelwork weights, decreases also the stress from wind and earthquakes to which the entire apparatus may be exposed.

In view of the fact that no support frames for the tube bundles are required, the flow of cooling air about the tube bundles is no longer impaired. This further improves the efficiency of the apparatus according to the invention.

The direct attachment of the condensate collection pipes underneath the tube bundles eliminates the need for a connection between the lower tube plates and the separate condensate collection pipes, as required to date. This is also accompanied by a reduced weight as well as a simplified welding operation during manufacture. Furthermore, the condensate collection pipes are able to realize a seal of the tube bundles beneath the lower tube plates so that the need for cost-intensive sealing plates, as required to date, beneath the tube bundles for preventing a recirculation of cooling air is eliminated.

Advantageously, the tube bundles together with the condensate collection pipes can be pre-assembled by the manufacturer, thereby significantly reducing cost-intensive welding seams and modifications in the area of the lower tube plates of the tube bundles.

The limited pivotability of opposing tube bundles via their upper tube plates allows a simple, rapid and cost-efficient change of a bundle inclination, if such is, for example, desired for process reasons. Prior art apparatuses require a change of the entire roof frame geometry, while the apparatus according to the invention allows a change of the inclination of the tube bundles through a simple adaptation of the positioning of the condensate collection pipes to the substructure as well as suitable selection of the mutual support of the tube bundles via their upper tube plates.

According to another feature of the present invention, the connection of the upper tube plates of the tube bundles can be realized by angle brackets, which are suitably arranged in spaced-apart disposition in longitudinal direction of the apparatus. They can be screwed or welded to the upper tube plates. A modification of the inclination of the tube bundles requires only replacement of these angle brackets. Still, the angle brackets permit a limited, mostly thermally based swivel mobility.

According to another variation, the upper tube plates may be coupled by fishplates which are placed above and below the upper tube plates and bolted together. Also in this case, it is only necessary, to loosen the bolted connection in order to quickly and safely change the tube bundle inclination.

According to still another variation, the upper tube plates may be connected to each other by hinged joints. In this case, there is no need at all for a replacement in the event of a change inclination of the tube bundles is desired. These hinged joints are each bolted or welded to the tubular plates via support sheets.

According to still another variation, the upper tube plates may be coupled with each other through U-shaped sections which are reinforced by webs and fastened to the underside of the upper tubular plates as well as connected to each other via webs. The U-shaped sections can be bolted or welded to the upper tubular plates as well as to one another. They often serve to secure a support rail for a crane path.

According to another feature of the present invention, the steam distribution duct may have a round cross section and is formed with a breach in the lower circumferential area, i.e. a wall area of the steam distribution duct has been removed. Welded next to the open circumferential area of the steam distribution duct on either side are one ends of spacers which are arranged in parallel relationship and welded with their other ends to the upper tube plates, in particular, to longitudinal edges that face away from one another. This configuration also allows that all components can follow the swivel movements at inclinations of the tube bundles.

According to another feature of the present invention, the condensate collection pipes may have a rectangular cross-section and can be defined by the lower tube plates of the tube bundles, bottom sheets and side sheets. According to the number of the neighboring tube bundles, these condensate collection pipes can be easily welded together. The carrying capability of the condensate collection pipes as well as the retention of the cross section is ensured by exterior vertical ribs. This, however, may also be realized by a thickening of the wall of the side sheets.

As an alternative, the condensate collection pipes may also have a triangular cross section and may also be externally reinforced by vertical ribs, whereby the cross section of the condensate collection pipes narrows from the tube bundles in the direction of the substructure.

The condensate collection pipes may also have a round cross section, in which case they are open in an area confronting the tube bundles and spaced from the lower tube plates by parallel longitudinal webs arranged next to the open circumferential areas. Suitably, all components are welded together. The condensate collection pipes as well as the longitudinal webs are externally reinforced by ribs.

Suitably, the displaceable positioning of the relative to the substructure may be implemented by guiding the condensate collection pipes on slide rails: which are directly mounted to the substructure or mounted to the substructure via base supports. In this manner, the tube bundles can follow any changes in length and width based on thermal influences without constraints.

According to another feature of the present invention, the slide rails may have a rectangular cross section, and the base supports may be guided by high-polished stainless steel angles on the slide rails, with the angles having predetermined areas coated with a sliding layer of polytetrafluoroethylene. The angles are arranged directly underneath the condensate collection pipes or at the lower ends of the base supports, and have a vertical leg and a horizontal leg for overlapping the rectangular slide rails from the vertical longitudinal center plane of the apparatus. The sliding layers made of polytetrafluoroethylene can be provided spotwise on the surfaces confronting the legs of the angle. Of course, strip-like sliding layers are also conceivable.

Suitably, the base supports are secured to the slide rails by screw fasteners which allow a limited movement between the base supports and the slide rails. In this manner, detachment from the slide rails is prevented. The screw fasteners may also be used to fasten the slide rails to the substructure.

According to variation of a sliding support of the condensate collection pipes, the slide rails are detachably or permanently secured to the substructure and may have a U-shaped configuration and are upwardly open. The bottom and the insides of the slide rails may be coated at predetermined areas with a sliding layer of polytetrafluoroethylene. Secured below the condensate collection pipes or the base supports in detachable or permanent manner are slide blocks, in particular, slide blocks of stainless steel. An engagement of the slide blocks in the slide rails ensures a perfect support of the tube bundles in the area of the condensate collection pipes.

According to another feature of the present invention, a rolling-type bearing of the condensate collection pipes on the substructure is also conceivable. This type of bearing may be realized directly or via base supports. A variation provides that the condensate collection pipes roll on the substructure via rollers mounted to the support stands. Suitably, the rollers may be supported by stop members towards the outside of the apparatus to absorb expansion forces.

According to another feature of the present invention, the condensate collection pipes may be supported on the substructure via multiple ball bearings. These multiple ball bearings can be provided, respectively, in circumferential regions of the vertical webs of a T-shaped base rail, and are overlapped by the vertical legs of a U-shaped slide rail which is directly or indirectly connected to a condensate collection pipe.

Suitably, the base supports are formed by U-shaped sections extending in the direction of the condensate collection pipes, when the condensate collection pipes have a round cross section. The U-shaped sections bear hereby with their legs upon the condensate collection pipes in circumferential manner. In this way, an exact position of the condensate collection pipes with respect to the base supports can be realized depending on the inclination of the tube bundles.

BRIEF DESCRIPTION OF THE DRAWING

Other features and advantages of the present invention will be more readily apparent upon reading the following description of preferred exemplified embodiments of the invention with reference to the accompanying drawing, in which:

FIG. 3 is a partial end view, on an enlarged scale, of the apparatus in the direction of arrow III in FIG. 1;

FIG. 4 is an enlarged cutaway view of a detail, marked IV in FIG. 3;

FIG. 5 is an illustration, similar to FIG. 3, of a second embodiment of an apparatus for steam condensation in accordance with the present invention;

FIG. 6 is an enlarged cutaway view of a detail, marked VI in FIG. 5;

DETAILED DESCRIPTION OF PREFERRED EMBODIMENTS

Figure 1:
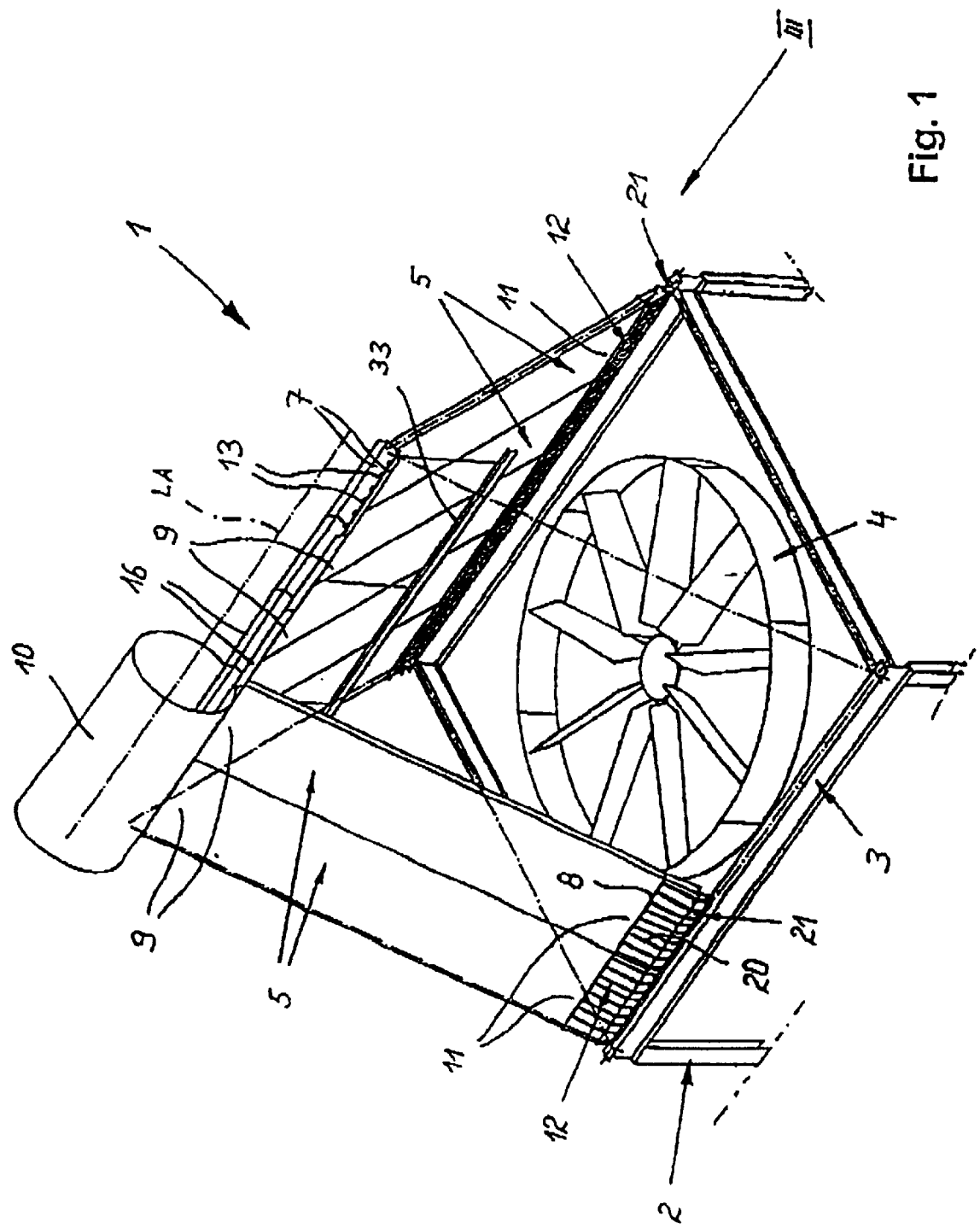
FIG. 1 is a schematic, perspective illustration, partially sectional, of one embodiment of an apparatus for steam condensation in accordance with the present invention.

Turning now to the drawing, and in particular to FIG. 1, there is shown a schematic, perspective illustration, partially sectional, of one embodiment of an apparatus for steam condensation in accordance with the present invention, generally designated by reference numeral 1. In a typical configuration, a plurality of such apparatuses 1 can be arranged side-by-side in parallel relationship and in succession.

The apparatus 1 includes a substructure 2 in the form of several vertical and horizontal steel beams. The substructure 2 has a platform 3 for support of a ventilating fan 4. Disposed above the fan 4 are self-supported tube bundles 5 of rectangular cross section which are arranged in a pitched-roof shaped manner in symmetry to a vertical center longitudinal plane MLE (FIG. 3). As shown in particular in FIG. 2, the tube bundles 5 are composed of ribbed tubes 6 as well as upper tubular plates 7 and lower tubular plates 8. The tube bundles 5 have upper ends 9 in fluid communication with a steam distribution duct 10 disposed at the ridge of the pitched-roof configuration of the tube bundles 5 and defined by a longitudinal axis LA intersecting the center longitudinal plane MLE. At their lower ends 11, the tube bundles 5 are fluidly connected to condensate collection pipes 12 (FIG. 1).

Figure 2:
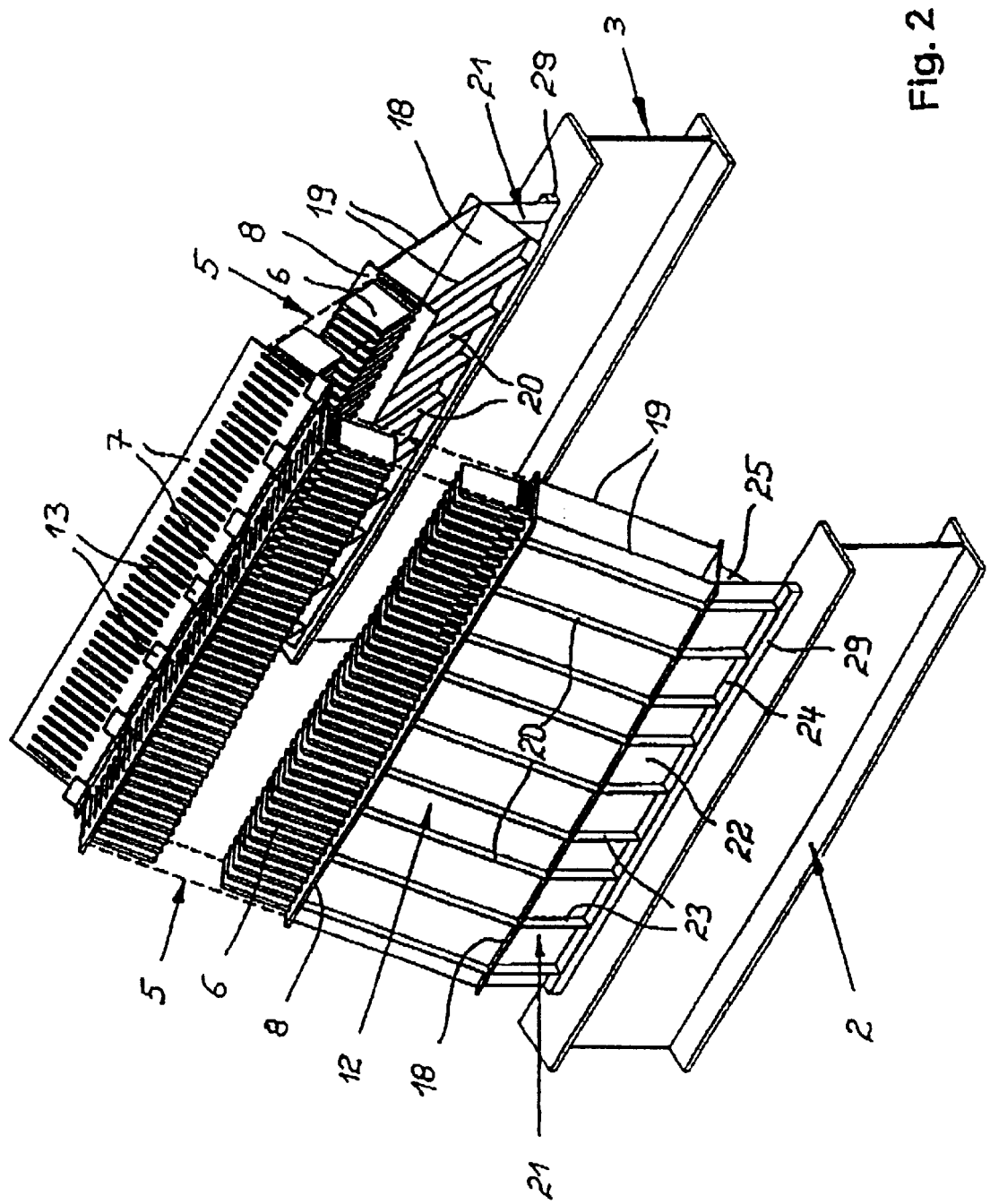
FIG. 2 is a partially sectional perspective illustration, on an enlarged scale, of two tube bundles of the apparatus of FIG. 1, mutually supporting one another in the area of the ridge.
Figure 11:
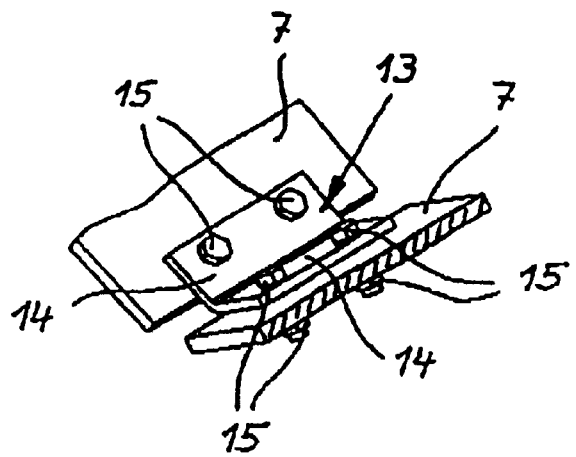
FIG. 11 is an enlarged, perspective cutaway view of detail, marked XI in FIG. 3.

As shown in FIGS. 1 to 3, the tube bundles 5 are connected to each other at their upper tube plates 7 by several angle brackets 13 having legs 14 which are mounted to the upper tube plates 7 by screw fasteners 15 (FIG. 11). The angle brackets 13 are sufficiently sized to absorb encountered forces from wind, snow as well as earthquakes and to realize a mutual support of the tube bundles 5, and at the same time are sufficiently soft to permit angular rotation in the area of the upper tube plates 7 as a result of thermal expansion of the tube bundles 5.

Spacers 16 in parallel relationship are welded to the outer longitudinal edges of the upper tube plates 7 and, as shown in FIG. 3, are welded to the outside next to an open lower circumferential area 17 of the round steam distribution duct 10. Welded to the lower tube plates 8 of the tube bundles 5 are the condensate collection pipes 12 which have a rectangular cross section and are bounded by the lower tube plates 8, bottom sheets 18 and side sheets 19. The outside of the side sheets 19 of the condensate collection pipes 12 are reinforced by vertical ribs 20.

Base supports, generally designated by reference numeral 21, are welded to the bottom sheets 18 of the condensate collection pipes 12. As shown in particular in FIG. 4, the base supports include a vertical web plate 22, a plurality of outer vertical ribs 23 mounted in spaced-apart relationship to the web plate 22 and extending between the bottom sheets 18 and a longitudinal bottom ledge 24, and inner reinforcement sheets 25 as well as a stainless steel angle 26 having a vertical leg 27 and a horizontal leg 28. The angles 26 may be mounted over the entire length of the base supports 21 or only in predetermined regions, and implement a forced guidance of the condensate collection pipes 12 in rectangular slide rails 29 which are secured to the substructure 2. On predetermined regions of its side surfaces, which confront the legs 27, 28 of the angles 26, the slide rails 29 are coated with sliding layers 30 of polytetrafluoroethylene (FIG. 4). As further shown in FIG. 4, the base supports 21 are connected to the slide rails 29 by screw fasteners 31 which allow a relative motion of the base support 21 towards the slide rails 29, but prevent a detachment of the tube bundles 5 from the substructure 2. Screw fasteners 32 secure the slide rails 29 to the substructure 2.

Referring back to FIG. 1, there is shown a support rail 33 beneath the steam distribution duct 10 for travel of a, not shown, crane by which, for example, the motor and the transmission of the fan 4 can be exchanged.

Turning now FIG. 5, there is shown an illustration, similar to FIG. 3, of a second embodiment of an apparatus for steam condensation in accordance with the present invention, generally designated by reference numeral 1a. In describing the following FIGS. 5, 6 and 14, like parts of the apparatus 1a corresponding with those of the apparatus 1 in FIG. 1 will be identified by corresponding reference numerals followed by the distinguishing lower case "a". The apparatus 1a differs from the apparatus 1 in the configuration of the connection of the upper tube plates 7, the cross sectional shape of the condensate collection pipes 12a and the support of the condensate collection pipes 12a upon the substructure 2.

Figure 14:
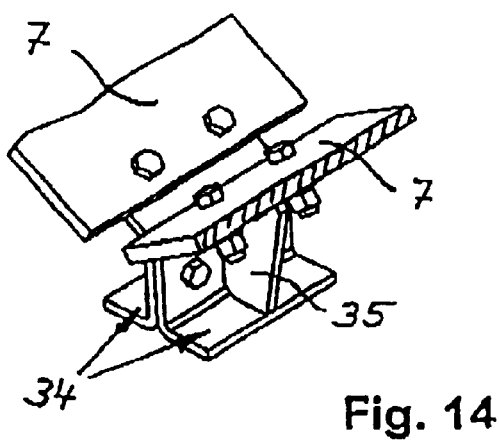
FIG. 14 is an enlarged, perspective cutaway view of detail, marked XIV in FIG. 5.

The connection of the upper tube plates 7 is realized by trapezoidal sections 34 which, as best seen in FIG. 14, are bolted together as well as to the underside of the tube plates 7. These sections 34 are reinforced by webs 35 and may be used for suspension of a support rail 33, as shown in FIG. 1, for travel of a, not shown, crane. The condensate collection pipes 12a, which are disposed beneath the tube bundles 5, have a round cross section, as shown in FIG. 5, and are breached on their side confronting the tube bundles 5 to define an open circumferential area 36 for welded connection to one end of parallel longitudinal webs 37 which are welded on their other end to the lower tube plates 8. The longitudinal webs 37 as well as the condensate collection pipes 12a are reinforced by external ribs 38, 39.

As further shown in FIG. 5, the condensate distribution pipes 12a are provided in a transition area from the wall surface 40 to the longitudinal web with an inner cross ribbing 41. Welded longitudinally to the circumferential area of the condensate collection pipes 12a, facing away from the lower tube plates 8, are legs 43 of U-shaped iron mounts 42 which, in turn, are screwed to base supports 21a comprised of longitudinal sheets 44, 45, 46, traverse webs 48 and bottom sheets 47. As shown in FIG. 6, several slide blocks 49, made of stainless steel, are spaced apart in longitudinal direction and secured by screw fasteners 50 underneath the base supports 21a. The slide blocks 49 engage in upwardly open U-shaped slide rails 29a having a bottom 51 and legs 52. The inside of the bottom 51 and the legs 52 of the slide rails 29a are coated along predetermined areas with sliding layers 30 of polytetrafluoroethylene. The slide rails 29a may be detachably or permanently secured to the substructure 2.

Although not shown in the drawing, persons skilled in the art will understand that the upper tube plates 7 of the apparatus 1a may, of course, also be connected in a manner shown in FIGS. 3 and 11. Furthermore, the condensate collection pipes 12a may be guided at all times on the substructure 2 in a manner shown in FIGS. 2 to 4.

Figure 7:
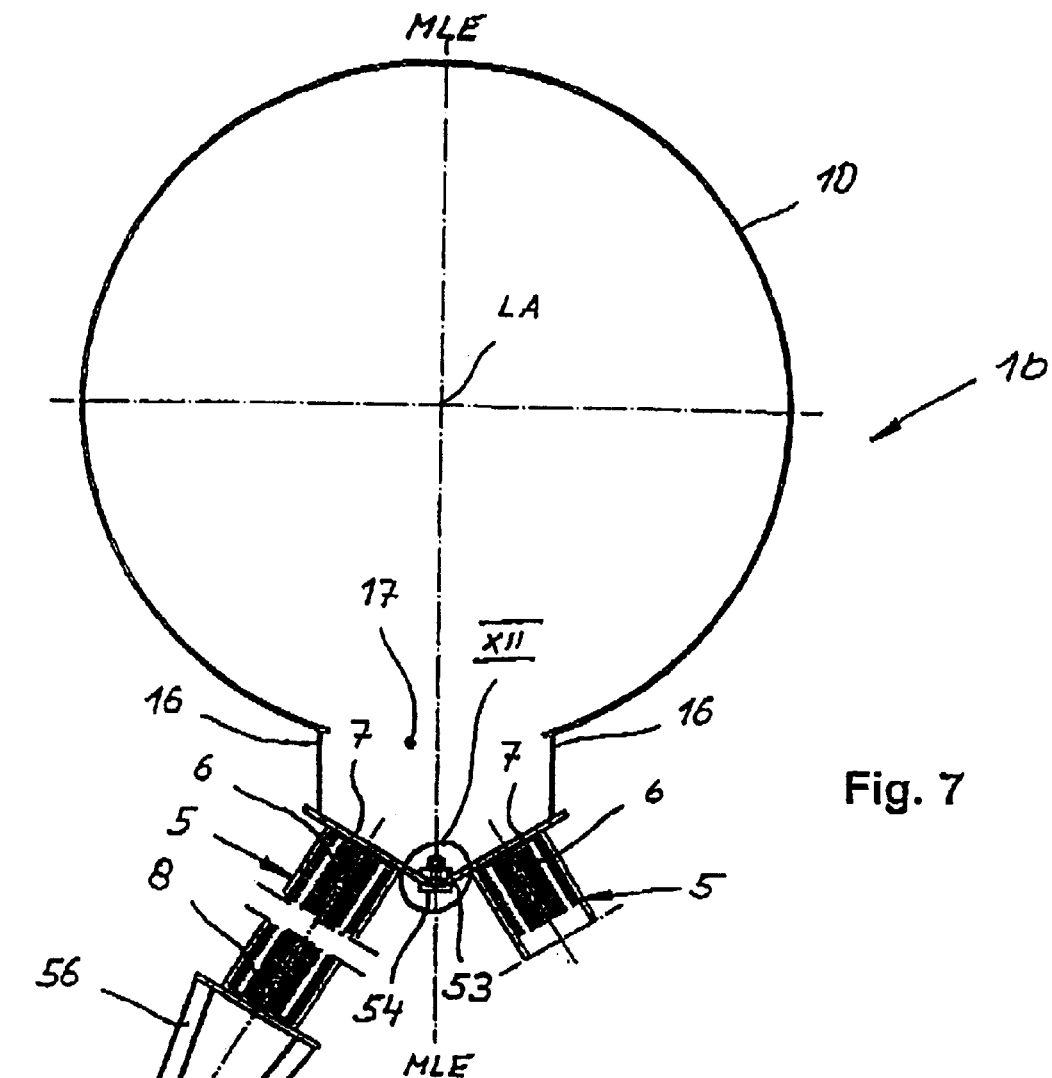
FIG. 7 is an illustration, similar to FIG. 3, of a third embodiment of an apparatus for steam condensation in accordance with the present invention.
Figure 8:
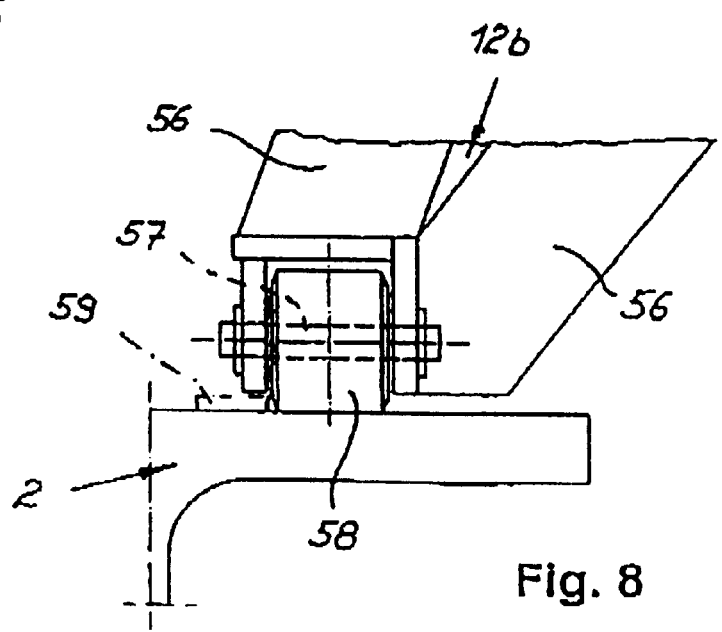
FIG. 8 is an enlarged cutaway view of a detail, marked VIII in FIG. 5.
Figure 12:
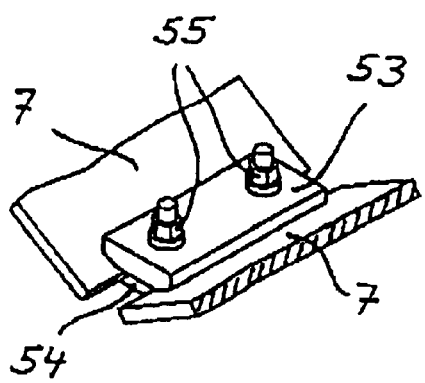
FIG. 12 is an enlarged, perspective cutaway view of detail, marked XII in FIG. 7.

Turning now FIG. 7, there is shown an illustration, similar to FIG. 3, of a third embodiment of an apparatus for steam condensation in accordance with the present invention, generally designated by reference numeral 1b. In describing the following FIGS. 7, 8 and 12, like parts of the apparatus 1b corresponding with those of the apparatus 1 in FIG. 1 will be identified by corresponding reference numerals followed by the distinguishing lower case "b". As shown in particular in conjunction with FIG. 12, the upper tube plates 7 of the tube bundles 5 are interconnected by fishplates 53, 54 which are placed above and below the upper tube plates 7 at their juncture and bolted together by screw fasteners 55.

The condensate collection pipes 12b have a triangular cross section and are welded to the lower tube plates 8, with exterior vertical ribs 56 reinforcing the condensate collection pipes 12b. Rollers 58 are mounted to the lower ends of the condensate collection pipes 12b for rotation about horizontal axes 57, and roll along the substructure 2. As illustrated by dash-dot line in FIG. 8, the rollers 58 can travel against lateral stop members 59 to prevent an opening out of the tube bundles 5.

Of course, the upper tube plates 7 of the apparatus 1b of FIG. 7 may also be connected in a manner described with reference to FIGS. 3 and 5. Furthermore, the triangular-shaped condensate collection pipes 12b may be supported by the substructure 2 in a manner described with reference to FIGS. 3 and 5.

Figure 9:
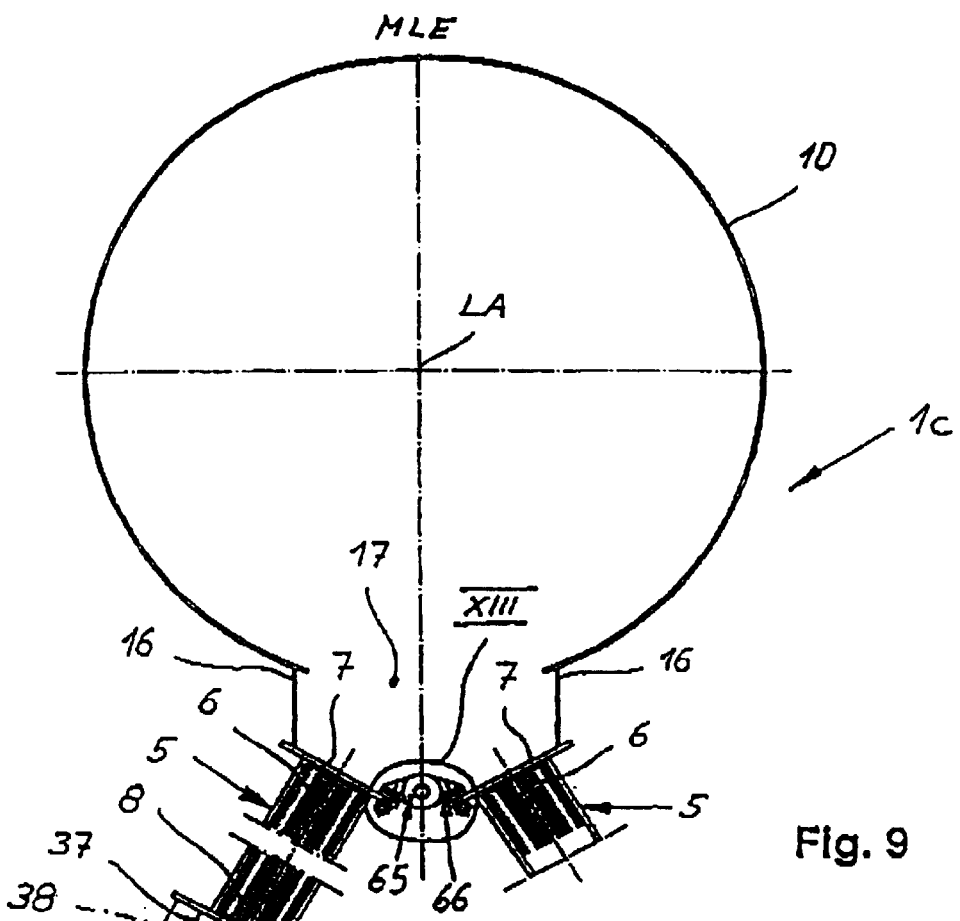
FIG. 9 is an illustration, similar to FIG. 3, of a fourth embodiment of an apparatus for steam condensation in accordance with the present invention.
Figure 10:
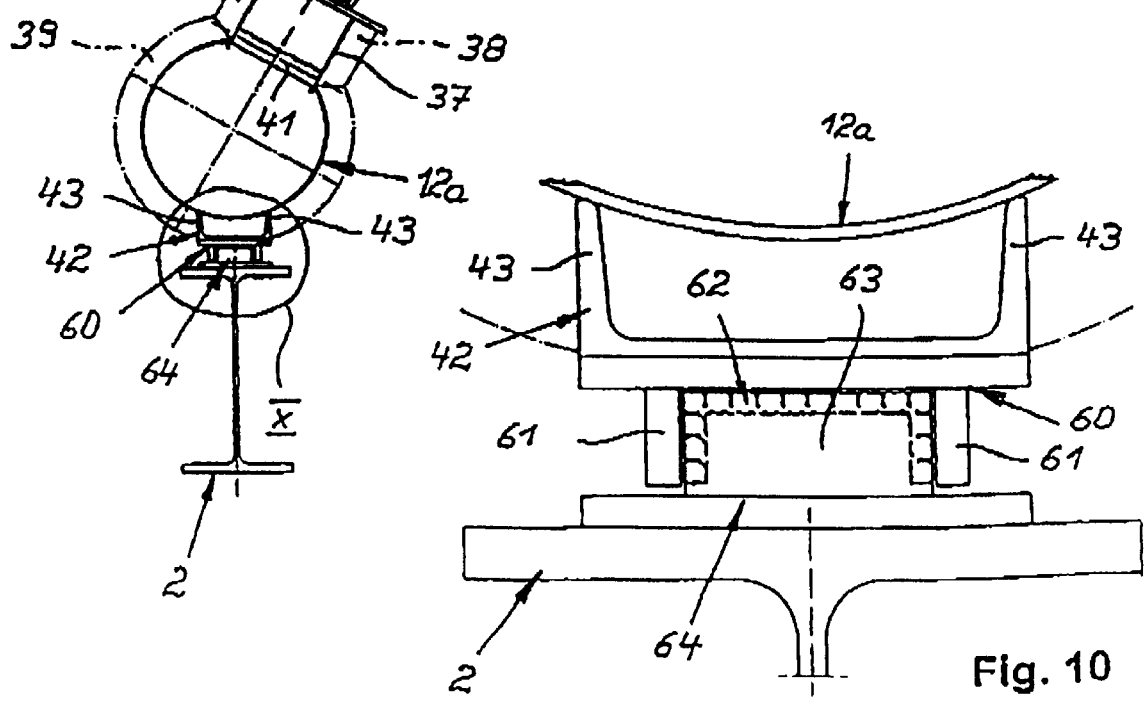
FIG. 10 is an enlarged cutaway view of a detail, marked X in FIG. 5.

Turning now FIG. 9, there is shown an illustration, similar to FIG. 3, of a fourth embodiment of an apparatus for steam condensation in accordance with the present invention, generally designated by reference numeral 1c. In describing the following FIGS. 9, 10 and 13, like parts of the apparatus 1c corresponding with those of the apparatus 1 in FIG. 1 will be identified by corresponding reference numerals followed by the distinguishing lower case "c". The apparatus 1c includes also condensate collection pipes 12a of round cross section which are connected to the lower tube plates 8 via longitudinal webs 37 and reinforced on the inside by cross ribbing 41. Externally, the longitudinal webs 37 as well as the condensate collection pipes 12a are reinforced by ribs 38, 39. The condensate collection pipes 12a are welded to the legs 43 of U-shaped iron mounts 42, which, in turn, are welded to U-shaped sections 60 having legs 61 overlapping multiple ball bearings 62 which are provided at vertical webs 63 of T-shaped base rails 64. The base rails 64 are secured detachably or permanently to the substructure 2.

Figure 13:
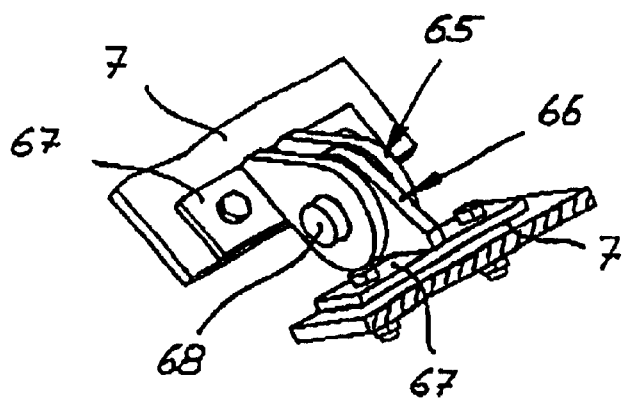
FIG. 13 is an enlarged, perspective cutaway view of detail, marked XIII in FIG. 9.

According to FIGS. 9 and 13, the upper tube plates 7 are connected to each other by hinged joints 65, 66, comprised of double plate 65, which is screwed to one of the upper tube plates 7 via a support sheet 67, and single plate 66, which engages between the double plate 65 and is screwed to the other one of the upper tube plates 7 also via a support sheet 67. The double plate 65 and the single plate 66 are connected with one another via a swivel bolt 68.

Persons skilled in the art will understand that the apparatus 1c may also be modified in a manner as described with reference to FIGS. 3 through 8.

While the invention has been illustrated and described as embodied in an apparatus for condensation of steam, it is not intended to be limited to the details shown since various modifications and structural changes may be made without departing in any way from the spirit of the present invention.

What is claimed as new and desired to be protected by Letters Patent is set forth in the appended claims:

1. Apparatus for the condensation of steam comprising:
   a substructure;
   a fan supported by the substructure;
   a plurality of self-supported tube bundles arranged in a roof-shaped manner in opposing relationship with respect to a vertical center longitudinal plane and mounted to the substructure above the fan, each of said tube bundles having an upper tube plate and a lower tube plate;
   a steam distribution duct fluidly connected and placed on top of the tube bundles;
   condensate collection pipes fluidly connected to the tube bundles and mounted to an underside of the lower tube plates;
   support means for so supporting the upper tube plates of opposite tube bundles as to allow a limited pivotal movement of the tube bundles;
   wherein the condensate collection pipes are so positioned on the substructure as to be shiftable relative to the substructure in parallel relationship to the center longitudinal axis.

2. The apparatus of claim 1, wherein the support means includes angle brackets for connecting the upper tube plates with one another.

3. The apparatus of claim 1, wherein the support means includes fishplates placed above and below the upper tube plates and bolted together for coupling the upper tube plates.

4. The apparatus of claim 1, wherein the support means includes hinged joints for connecting the upper tube plates with one another.

5. The apparatus of claim 1, wherein the support means includes U-shaped sections mounted to an underside of the upper tube plates and reinforced by webs, said sections being coupled to one another.

6. The apparatus of claim 1, wherein the steam distribution duct has a round cross section, wherein the steam distribution duct has a breach in a lower circumferential area, and further comprising spacers arranged in parallel relation on either side next to the breach of the steam distribution duct and secured to the upper tube plates.

7. The apparatus of claim 1, wherein the condensate collection pipes have a rectangular cross section and are reinforced on their outside by vertical ribs.

8. The apparatus of claim 1, wherein the condensate collection pipes have a triangular cross section and are reinforced on their outside by vertical ribs.

9. The apparatus of claim 1, wherein the condensate collection pipes have a round cross section, wherein the condensate collection pipes are open in an area facing the tube bundles, wherein the condensate collection pipes are connected to the lower tube plates of the tube bundles via parallel longitudinal webs, wherein the condensate collection pipes are reinforced on their outside by ribs, wherein the longitudinal webs are reinforced on their outside by ribs.

10. The apparatus of claim 1, and further comprising slide rails secured to the substructure, wherein the condensate collection pipes are guided directly on slide rails.

11. The apparatus of claim 1, and further comprising slide rails secured to the substructure, and base supports extending between the condensate collection pipes and the slide rails, wherein the condensate collection pipes are guided via the base supports on the guide rails.

12. The apparatus of claim 11, wherein the slide rails have a rectangular cross section, wherein the base supports are guided by high-polished stainless steel angles on the slide rails, wherein the angles have predetermined areas coated with a sliding layer of polytetrafluoroethylene.

13. The apparatus of claim 11, wherein the base supports are secured to the slide rails by screw fasteners which allow a limited movement between the base supports and the slide rails.

14. The apparatus of claim 11, wherein the slide rails have a U-shaped configuration and are upwardly open, wherein the slide rails are coated on predetermined regions with a sliding layer of polytetrafluoroethylene, and further comprising slide blocks extending downwards from the base supports for engagement in the slide rails to thereby guide the base supports in the slide rails.

15. The apparatus of claim 1, wherein the condensate collection pipes are supported for rolling motion directly on the substructure.

16. The apparatus of claim 1, and further comprising base supports for rollingly supporting the condensate collection pipes on the substructure.

17. The apparatus of claim 16, wherein the base supports have rollers for supporting the condensate collection pipes on the substructure.

18. The apparatus of claim 1, and further comprising multiple ball bearings for supporting the condensate collection pipes on the substructure.

* * * * *